(12) United States Patent
Nakagawa et al.

(10) Patent No.: US 11,458,389 B2
(45) Date of Patent: Oct. 4, 2022

(54) VIBRATION CONTROL APPARATUS

(71) Applicant: Sony Interactive Entertainment Inc., Tokyo (JP)

(72) Inventors: Yusuke Nakagawa, Kanagawa (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/603,095

(22) PCT Filed: Apr. 26, 2017

(86) PCT No.: PCT/JP2017/016552
§ 371 (c)(1),
(2) Date: Oct. 4, 2019

(87) PCT Pub. No.: WO2018/198229
PCT Pub. Date: Nov. 1, 2018

(65) Prior Publication Data
US 2020/0070047 A1 Mar. 5, 2020

(51) Int. Cl.
*A63F 13/285* (2014.01)
*A63F 13/79* (2014.01)
*G06F 3/01* (2006.01)

(52) U.S. Cl.
CPC ............ *A63F 13/285* (2014.09); *A63F 13/79* (2014.09); *G06F 3/016* (2013.01); *A63F 2300/1037* (2013.01); *G06F 2203/013* (2013.01)

(58) Field of Classification Search
CPC ........ A63F 13/24; A63F 13/285; A63F 13/79; A63F 2300/1037
See application file for complete search history.

(56) References Cited

U.S. PATENT DOCUMENTS

| | | |
|---|---|---|
| 5,889,670 A | 3/1999 | Schuler |
| 6,766,299 B1 | 7/2004 | Bellomo |
| 6,864,877 B2 | 3/2005 | Braun |
| 7,010,488 B2 | 3/2006 | van Santen |
| 7,218,310 B2 | 5/2007 | Goldenberg |
| 8,248,218 B2 | 8/2012 | Yamaya |
| 8,249,276 B2 | 8/2012 | Hamada |
| 8,325,144 B1 | 12/2012 | Tierling |

(Continued)

FOREIGN PATENT DOCUMENTS

| | | |
|---|---|---|
| EP | 0999518 A1 | 5/2000 |
| JP | 0884858 A | 4/1996 |

(Continued)

OTHER PUBLICATIONS

International Search Report for related PCT Application No. PCT/JP2017/030344, 4 pages, dated Oct. 10, 2017.

(Continued)

*Primary Examiner* — William H McCulloch, Jr.
(74) *Attorney, Agent, or Firm* — Matthew B. Dernier, Esq.

(57) ABSTRACT

Disclosed herein is a vibration control apparatus that receives a vibration instruction and vibrates a vibration device in accordance with content obtained by correcting the content of the received vibration instruction, wherein the vibration control apparatus determines the correction content for vibration in accordance with a user using the vibration device.

8 Claims, 2 Drawing Sheets

(56) References Cited

U.S. PATENT DOCUMENTS

| | | | |
|---|---|---|---|
| 8,384,316 B2 | 2/2013 | Houston | |
| 8,479,274 B2* | 7/2013 | Furukawa | G06F 21/32 |
| | | | 726/9 |
| 8,487,759 B2 | 7/2013 | Hill | |
| 8,727,878 B2 | 5/2014 | Longdale | |
| 8,787,586 B2 | 7/2014 | Hamada | |
| 9,007,445 B2 | 4/2015 | Oikawa | |
| 9,070,282 B2 | 6/2015 | Clough | |
| 9,098,984 B2 | 8/2015 | Heubel | |
| 9,135,791 B2 | 9/2015 | Nakamura | |
| 9,430,700 B2 | 8/2016 | Yagcioglu | |
| 9,436,280 B2 | 9/2016 | Tartz | |
| 9,459,632 B2* | 10/2016 | Houston | G05D 19/02 |
| 9,542,745 B2 | 1/2017 | Moteki | |
| 9,630,098 B2 | 4/2017 | Mikhailov | |
| 9,753,537 B2 | 9/2017 | Obana | |
| 9,792,501 B1 | 10/2017 | Maheriya | |
| 9,846,484 B2 | 12/2017 | Shah | |
| 9,940,716 B2 | 4/2018 | Chevassus | |
| 9,946,347 B2 | 4/2018 | Nakagawa | |
| 9,952,670 B2 | 4/2018 | Watanabe | |
| 9,983,671 B2 | 5/2018 | Adachi | |
| 10,109,161 B2 | 10/2018 | Shah | |
| 10,150,029 B2 | 12/2018 | Yamano | |
| 10,175,761 B2 | 1/2019 | Cruz-Hernandez | |
| 10,347,093 B2 | 7/2019 | Rihn | |
| 10,394,326 B2 | 8/2019 | Ono | |
| 10,444,837 B2 | 10/2019 | Takeda | |
| 10,969,867 B2* | 4/2021 | Nakagawa | G06F 3/03547 |
| 10,981,053 B2* | 4/2021 | Nakagawa | G06F 3/01 |
| 11,013,990 B2* | 5/2021 | Nakagawa | A63F 13/215 |
| 11,145,172 B2* | 10/2021 | Nakagawa | G06F 3/01 |
| 11,198,059 B2* | 12/2021 | Konishi | A63F 13/79 |
| 11,253,776 B2* | 2/2022 | Enokido | A63F 13/44 |
| 11,260,286 B2* | 3/2022 | Enokido | A63F 13/44 |
| 2002/0030663 A1 | 3/2002 | Goldenberg | |
| 2002/0080112 A1 | 6/2002 | Braun | |
| 2002/0163498 A1 | 11/2002 | Chang | |
| 2003/0030619 A1 | 2/2003 | Martin | |
| 2003/0212555 A1 | 11/2003 | van Santen | |
| 2004/0220812 A1 | 11/2004 | Bellomo | |
| 2005/0134562 A1 | 6/2005 | Grant | |
| 2007/0091063 A1 | 4/2007 | Nakamura | |
| 2007/0248235 A1 | 10/2007 | Hamada | |
| 2007/0253178 A1* | 11/2007 | Uchiumi | H02K 5/00 |
| | | | 361/807 |
| 2008/0064500 A1* | 3/2008 | Satsukawa | A63F 13/04 |
| | | | 463/37 |
| 2008/0204266 A1 | 8/2008 | Malmberg | |
| 2008/0262658 A1 | 10/2008 | Ding | |
| 2009/0017911 A1 | 1/2009 | Miyazaki | |
| 2010/0016077 A1 | 1/2010 | Longdale | |
| 2010/0056208 A1* | 3/2010 | Ashida | G01C 22/006 |
| | | | 455/556.1 |
| 2010/0085462 A1 | 4/2010 | Sako | |
| 2010/0090815 A1 | 4/2010 | Yamaya | |
| 2010/0091096 A1 | 4/2010 | Oikawa | |
| 2010/0245237 A1 | 9/2010 | Nakamura | |
| 2011/0012717 A1 | 1/2011 | Pance | |
| 2011/0039606 A1 | 2/2011 | Kim | |
| 2011/0075835 A1 | 3/2011 | Hill | |
| 2011/0163946 A1 | 7/2011 | Tartz | |
| 2012/0028710 A1* | 2/2012 | Furukawa | G06F 21/32 |
| | | | 463/37 |
| 2012/0232780 A1 | 9/2012 | Delson | |
| 2012/0281849 A1 | 11/2012 | Hamada | |
| 2013/0057509 A1 | 3/2013 | Cruz-Hernandez | |
| 2013/0250502 A1 | 9/2013 | Tossavainen | |
| 2013/0261811 A1 | 10/2013 | Yagi | |
| 2014/0169795 A1 | 6/2014 | Clough | |
| 2014/0176415 A1 | 6/2014 | Buuck | |
| 2014/0212000 A1 | 7/2014 | Yagcioglu | |
| 2014/0220520 A1 | 8/2014 | Salamini | |
| 2014/0266644 A1 | 9/2014 | Heubel | |
| 2014/0361956 A1 | 12/2014 | Mikhailov | |
| 2015/0042484 A1 | 2/2015 | Bansal | |
| 2015/0059086 A1 | 3/2015 | Clough | |
| 2015/0070261 A1 | 3/2015 | Saboune | |
| 2015/0081110 A1* | 3/2015 | Houston | G05D 19/02 |
| | | | 700/280 |
| 2015/0243016 A1 | 8/2015 | Moteki | |
| 2015/0273322 A1 | 10/2015 | Nakagawa | |
| 2015/0297990 A1 | 10/2015 | Mahlmeister | |
| 2015/0302854 A1 | 10/2015 | Clough | |
| 2015/0323996 A1 | 11/2015 | Obana | |
| 2015/0339819 A1 | 11/2015 | Chevassus | |
| 2015/0356838 A1 | 12/2015 | Obana | |
| 2016/0012687 A1 | 1/2016 | Obana | |
| 2016/0054797 A1 | 2/2016 | Tokubo | |
| 2016/0124707 A1 | 5/2016 | Ermilov | |
| 2016/0132117 A1 | 5/2016 | Asachi | |
| 2016/0144404 A1* | 5/2016 | Houston | H02K 33/00 |
| | | | 318/114 |
| 2016/0162025 A1* | 6/2016 | Shah | G06F 3/016 |
| | | | 345/156 |
| 2016/0214007 A1 | 7/2016 | Yamashita | |
| 2016/0258758 A1* | 9/2016 | Houston | G01C 21/20 |
| 2016/0310844 A1 | 10/2016 | Yamashita | |
| 2016/0342213 A1 | 11/2016 | Endo | |
| 2017/0038841 A1 | 2/2017 | Takeda | |
| 2017/0045991 A1 | 2/2017 | Watanabe | |
| 2017/0053502 A1 | 2/2017 | Shah | |
| 2017/0061784 A1 | 3/2017 | Clough | |
| 2017/0087458 A1 | 3/2017 | Nakagawa | |
| 2017/0092084 A1 | 3/2017 | Rihn | |
| 2017/0097681 A1 | 4/2017 | Ono | |
| 2017/0136354 A1 | 5/2017 | Yamano | |
| 2017/0139479 A1 | 5/2017 | Shimotani | |
| 2017/0180863 A1 | 6/2017 | Biggs | |
| 2017/0205883 A1 | 7/2017 | Tanaka | |
| 2017/0235364 A1 | 8/2017 | Nakamura | |
| 2017/0242486 A1 | 8/2017 | Grant | |
| 2018/0028911 A1 | 2/2018 | Aoki | |
| 2018/0067313 A1 | 3/2018 | Sako | |
| 2018/0098583 A1 | 4/2018 | Keller | |
| 2018/0203509 A1 | 7/2018 | Yamano | |
| 2018/0345131 A1 | 12/2018 | Yamashita | |
| 2019/0105563 A1 | 4/2019 | Yamano | |
| 2019/0278372 A1* | 9/2019 | Nakagawa | A63F 13/22 |
| 2019/0332174 A1 | 10/2019 | Nakagawa | |
| 2019/0334426 A1 | 10/2019 | Culbertson | |
| 2019/0369730 A1 | 12/2019 | Marchant | |
| 2020/0061459 A1* | 2/2020 | Nakagawa | G06F 3/01 |
| 2020/0061460 A1* | 2/2020 | Nakagawa | G06F 3/016 |
| 2020/0070047 A1* | 3/2020 | Nakagawa | A63F 13/79 |
| 2020/0122028 A1* | 4/2020 | Konishi | G06F 3/016 |
| 2020/0225755 A1 | 7/2020 | Lee | |
| 2020/0238168 A1* | 7/2020 | Konishi | A63F 13/285 |
| 2020/0238169 A1* | 7/2020 | Konishi | A63F 13/79 |
| 2020/0246692 A1* | 8/2020 | Nakagawa | A63F 13/23 |
| 2020/0282310 A1* | 9/2020 | Nakagawa | A63F 13/23 |
| 2020/0324194 A1* | 10/2020 | Enokido | A63F 13/22 |
| 2020/0324195 A1* | 10/2020 | Enokido | A63F 13/44 |
| 2020/0359687 A1 | 11/2020 | Scatterday | |
| 2021/0121776 A1* | 4/2021 | Nakagawa | H04R 1/00 |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |

(56) References Cited

FOREIGN PATENT DOCUMENTS

| | | | |
|---|---|---|---|
| JP | 2010092436 A | 4/2010 |
| JP | 2011501296 A | 1/2011 |
| JP | 2011183374 A | 9/2011 |
| JP | 2012103852 A | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

Office Action for related U.S. Appl. No. 16/345,071, 10 pages, dated Feb. 19, 2020.
Notice of Reasons for Refusal for corresponding JP Application No. 2019513214, 12 pages, dated Apr. 28, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.
Notice of Reasons for Refusal for corresponding JP Application No. 2019-537506, 4 pages dated Nov. 18, 2020.
International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
Office Action for related U.S. Appl. No. 16/500,651, 7 pages, dated Apr. 16, 2020.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
International Search Report for corresponding PCT Application No. PCT/JP2017/044074, 4 pages, dated Jan. 16, 2018.
International Search Report for corresponding PCT Application No. PCT/JP2017/015563, 2 pages, dated Jun. 13, 2017.
International Search Report for corresponding PCT Application No. PCT/JP2017/033925, 4 pages, dated Nov. 7, 2017.
International Search Report for corresponding PCT Application No. PCT/JP2017/015740, 4 pages, dated Jul. 4, 2017.
International Search Report for corresponding PCT Application No. PCT/JP2017/016552, 2 pages, dated Jun. 20, 2017.
International Preliminary Report on Patentability and Written Opinion for corresponding PCT Application No. PCTJP2017044075, 15 pages, dated Jun. 27, 2019.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.

* cited by examiner

FIG.3

| USER | APPLICATION PROGRAM | USE START TIME | TOTAL USE TIME | LEVEL OF ACHIEVEMENT |
|---|---|---|---|---|
| USER U1 | GAME A | YYYY/MM/DD | 12:25 | 52% |
| | GAME B | YYYY/MM/DD | 0:34 | 3% |
| | GAME C | YYYY/MM/DD | 7:50 | 35% |
| USER U2 | GAME B | YYYY/MM/DD | 23:12 | 78% |
| | GAME D | YYYY/MM/DD | 2:41 | 11% |
| ⋮ | ⋮ | ⋮ | ⋮ | ⋮ |

FIG.4

| USER | APPLICATION PROGRAM | CORRECTION AMOUNT |
|---|---|---|
| USER U1 | GAME A | +3 |
| | GAME B | ±0 |
| | GAME C | −2 |
| USER U2 | GAME B | −1 |
| | GAME D | +2 |
| ⋮ | ⋮ | ⋮ |

US 11,458,389 B2

VIBRATION CONTROL APPARATUS

TECHNICAL FIELD

The present invention relates to a vibration control apparatus that controls a vibration device that presents vibration to a user, a method of controlling a vibration device, and a control program.

BACKGROUND ART

Like an operation device or the like used in connection with a home video game machine, some devices used while worn or held on his/her own body by a user include a vibration mechanism for vibrating a part or all of the device. A vibration device including the above vibration mechanism operates the vibration mechanism at arbitrary timing to thereby present vibration to the user.

SUMMARY

Technical Problem

Normally, how the vibration device of a conventional example is vibrated is determined in accordance with processing content executed by an application program. However, in the case in which a plurality of users use the vibration devices, preference for vibration, how much the application program is used, or the like is different in each user. Therefore, the fact that vibration is presented to the plurality of users in the same mode across the board is not always appropriate in some cases.

The present invention has been made in view of the above circumstances. An object of the present invention is therefore to provide a vibration control apparatus capable of vibrating a vibration device in a mode appropriate to each user, a method of controlling a vibration device, and a control program.

Solution to Problem

A vibration control apparatus according to the present invention is a vibration control apparatus that vibrates a vibration device, including: a vibration instruction reception section configured to receive a vibration instruction; and a vibration control section configured to vibrate the vibration device in accordance with content obtained by correcting the content of the received vibration instruction, in which the vibration control section determines the correction content in accordance with a user using the vibration device.

A method of controlling a vibration device according to the present invention, includes: a step of receiving a vibration instruction; and a vibration control step of vibrating the vibration device in accordance with content obtained by correcting the content of the received vibration instruction, in which in the vibration control step, the correction content is determined in accordance with a user using the vibration device.

A program according to the present invention is a program for controlling a vibration device for causing a computer to function as: a vibration instruction reception section configured to receive a vibration instruction; and a vibration control section configured to vibrate the vibration device in accordance with content obtained by correcting the content of the received vibration instruction, in which the vibration control section determines the correction content in accordance with a user using the vibration device. The program may be stored in a computer readable non-transitory information storage medium for provision.

BRIEF DESCRIPTION OF DRAWINGS

FIG. 3 is a diagram illustrating one example of history information recorded in the vibration control apparatus.

FIG. 4 is a diagram illustrating one example of correction information designated by a user in each application program.

DESCRIPTION OF EMBODIMENT

Hereinafter, preferred embodiments of the present invention will be described with reference to the appended drawings.

A vibration control system 1 according to one example of an embodiment of the present invention includes a vibration control apparatus 10 and a vibration device 20 connected to the vibration control apparatus 10.

The vibration device 20 is a device used when held with hands by a user or when worn on a body of the user. The vibration device 20 houses a vibration mechanism 21 and vibration is presented to the user by operating the vibration mechanism 21. The vibration mechanism 21 may be various vibration generating devices such as a linear resonant actuator, a voice coil motor, or an eccentric motor. In addition, the vibration device 20 may include various operating members such as a manual operation button or a lever used as an operation object by the user. Note that, in the present embodiment, it is assumed that there is a possibility that a plurality of users use the vibration device 20.

Figure 1:
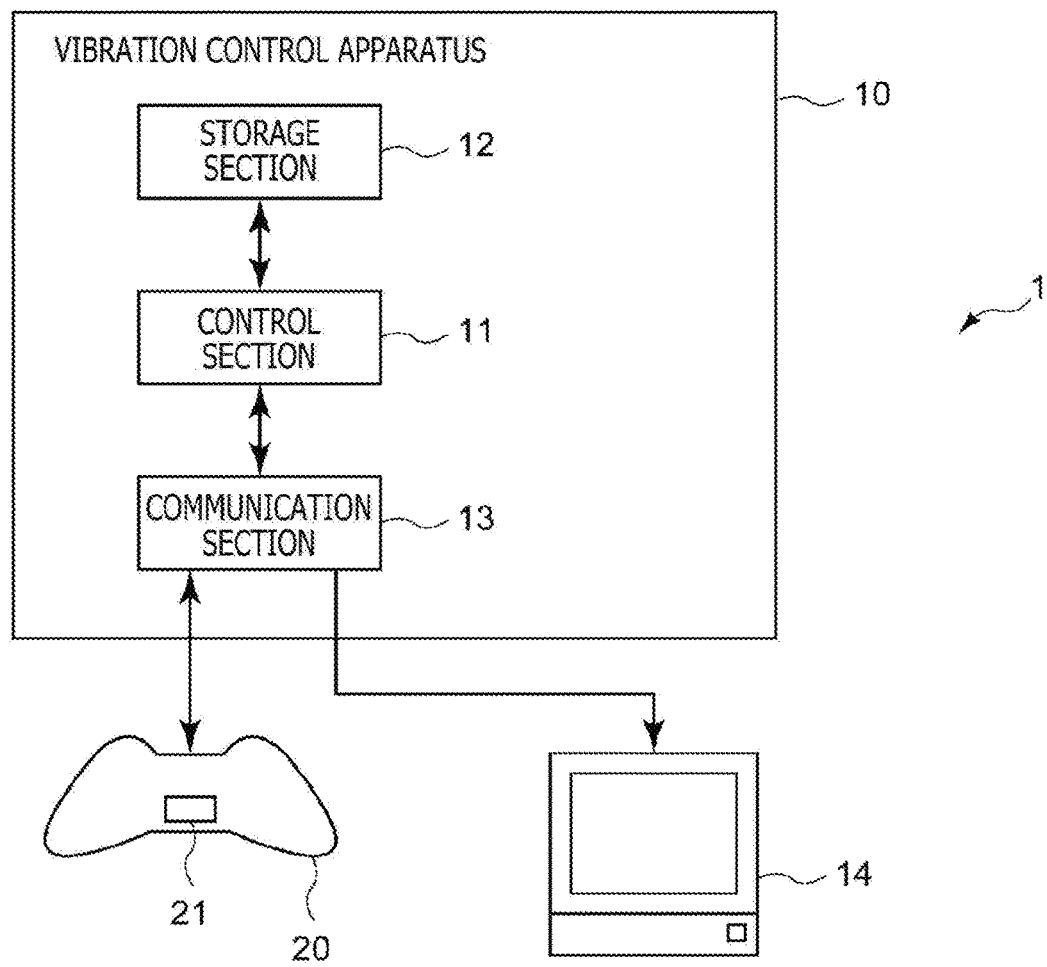
FIG. 1 is a block diagram illustrating a configuration example of a vibration control system including a vibration control apparatus according to an embodiment of the present invention.

The vibration control apparatus 10 may be information processing apparatus communicatively connected to the vibration device 20 and may be, for example, a home video game machine, a personal computer, or the like. In the present embodiment, the vibration control apparatus 10 is communicatively connected also to a display apparatus 14. As illustrated in FIG. 1, the vibration control apparatus 10 includes a control section 11, a storage section 12, and a communication section 13.

The control section 11 includes a program control device such as a central processing unit (CPU) and executes various information processings in accordance with programs stored in the storage section 12. Content of specific processings of the control section 11 will be described in detail below.

The storage section 12 is a memory device or the like and holds programs executed by the control section 11. The program may be a program that is stored in a computer-readable non-transitory storage medium for provision and is duplicated in the storage section 12. Also, the storage section 12 operates as a work memory of the control section 11. In addition, the storage section 12 includes a nonvolatile storage apparatus such as a hard disk drive or a solid-state drive.

The communication section 13 includes a serial interface such as a Universal Serial Bus (USB) or a wireless communication interface such as a Bluetooth (registered trademark). The vibration control apparatus 10 is communicably connected to the vibration device 20 via the communication section 13. Particularly, in the present embodiment, the communication section 13 transmits a control signal for operating the vibration mechanism 21 in accordance with an instruction from the control section 11. Further, the communication section 13 includes a communication interface for communicating with the display apparatus 14 by wire or wireless. The vibration control apparatus 10 transmits data of videos to be displayed by the display apparatus 14 to the display apparatus 14 via the communication section 13.

The display apparatus 14 displays videos based on video signals transmitted by the vibration control apparatus 10. For example, the display apparatus 14 may be a device of a type used while worn on the head by the user such as a head-mounted display.

Figure 2:
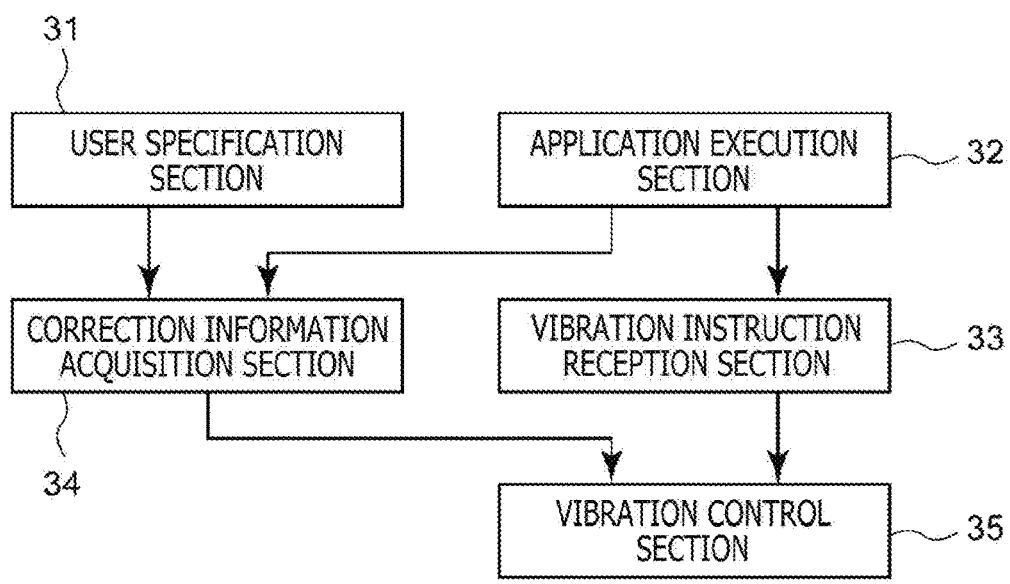
FIG. 2 is a functional block diagram illustrating functions of the vibration control apparatus according to the embodiment of the present invention.

Hereinafter, operations of the control section 11 of the vibration control apparatus 10 will be described. As exemplified in FIG. 2, in the present embodiment, the control section 11 functionally includes a user specification section 31, an application execution section 32, a vibration instruction reception section 33, a correction information acquisition section 34, and a vibration control section 35. The control section 11 operates in accordance with the programs stored in the storage section 12, and thereby the above functions are realized. The program may be provided to the vibration control apparatus 10 through a communication network such as the Internet. Alternatively, the program may be stored in a computer readable information storage medium such as an optical disk for provision.

The user specification section 31 specifies the user using the vibration device 20. For example, the user specification section 31 receives an input of account information from the user prior to the execution of an application program by the application execution section 32. Thereby, the user specification section 31 can specify who uses the vibration device 20 from now.

The control section 11 executes the application program and thereby the application execution section 32 is realized. Particularly, in the present embodiment, the application execution section 32 executes one of a plurality of kinds of application programs for realizing respective games. The application execution section 32 executes various processings in accordance with operation content or the like of the user for the vibration device 20 and causes the display apparatus 14 to display processing results thereof on a screen.

Further, the application execution section 32 outputs vibration instruction data for vibrating the vibration device 20 in accordance with processing content thereof. The vibration instruction data includes data for instructing the vibration instruction reception section 33 how the vibration mechanism 21 of the vibration device 20 is vibrated. For example, the vibration instruction data may include data in which a waveform of vibration to be generated by the vibration mechanism 21 is encoded. In the case, an actual operation mode of the vibration mechanism 21 is regulated by amplitude and frequency of the waveform. The above vibration instruction data may be described by a format having a resemblance to voice data. Further, it is assumed that the vibration instruction data includes waveforms on which vibrations of a plurality of frequencies are superimposed similarly to the voice data. The vibration instruction data output by the application execution section 32 is stored in a buffer area secured within the storage section 12.

The vibration instruction reception section 33 receives a vibration instruction for vibrating the vibration device 20 from the application execution section 32. Specifically, the application execution section 32 subsequently reads out the vibration instruction data stored in the buffer area, and thereby the vibration instruction reception section 33 receives the vibration instruction.

The correction information acquisition section 34 acquires correction information used when the vibration control section 35 described below corrects content of the vibration. Particularly, in the present embodiment, the correction information acquisition section 34 acquires the correction information corresponding to the user specified by the user specification section 31. A specific example of the correction information will be described below.

The vibration control section 35 outputs a control command for operating the vibration mechanism 21 to the vibration device 20 on the basis of content of the vibration instruction received by the vibration instruction reception section 33. The vibration device 20 generates vibration of the strength or frequency appropriate to the content of the vibration instruction by operating the vibration mechanism 21 on the basis of the control command. Thereby, a body of the vibration device 20 can be vibrated in accordance with conditions of a game etc. executed by the application execution section 32 according to the present embodiment and vibration thereof can be presented to the user.

Further, in the present embodiment, the vibration control section 35 corrects the content of the vibration instruction on the basis of the correction information acquired by the correction information acquisition section 34 and outputs the control command for operating the vibration mechanism 21 in accordance with the corrected content to the vibration device 20. The vibration control section 35 executes correction processing described above to thereby adjust the vibration to be presented to the user in accordance with the content different in each user. Hereinafter, the correction information and a specific example of the correction processing appropriate to the content will be described.

First, as a first example, the correction processing appropriate to attribution of the user will be described. In the example, the correction information acquisition section 34 acquires attribute information regarding the user specified by the user specification section 31. The attribute information regarding the user is information regarding characteristics of the user such as sex or age of the user. For example, the correction information acquisition section 34 refers to profile information or the like preliminarily registered by each user using the vibration device 20, and thereby acquires the attribute information of the user currently using the vibration device 20.

The vibration control section 35 corrects a strength of vibration included in the vibration instruction data in accordance with the attribute information acquired by the correction information acquisition section 34. For example, a young user tends to like strong vibration in general. Consequently, the vibration control section 35 performs a correction for strengthening the vibration in the case in which an age of the user is included in a predetermined range. By contrast, in the case in which an age of the user is equal to or higher than a predetermined value, the vibration control section 35 may perform a correction for weakening the vibration. In addition, in accordance with the attribution to which the user belongs, the vibration control section 35 may perform various corrections.

Then, as a second example, the correction processing appropriate to a use history of the user will be described. In the example, the vibration control apparatus 10 is assumed to record information (history information) regarding the use history in the storage section 12 when each user has used the vibration device 20 and the vibration control apparatus 10 in the past. The correction information acquisition section 34 acquires the history information regarding the user specified by the user specification section 31 and the vibration control section 35 corrects the strength of the vibration in accordance with the history information.

Specifically, the history information may include used hours in which each user has used each application program in the past, a kind of used application program, and the like. FIG. 3 illustrates a specific example of the history information recorded in the vibration control apparatus 10. About each of the plurality of users, the history information illustrated in FIG. 3 includes a time at which the user starts use of each application program, a total use time, and a level of achievement. Here, any of the application programs are assumed to be game application programs and the level of achievement indicates how much the user plays a game thereof. Specifically, the level of achievement may be a value determined in accordance with a level or the like of a game player. Alternatively, the level of achievement may be an index value (the number of acquired trophies or the like) indicating how much the user achieves a plurality of targets set in the game.

With reference to the history information, for example, the vibration control section 35 determines how much the user currently using the vibration device 20 has played games in a particular category in the past. Then, if it is determined that the application programs in the particular category have been used for a predetermined time or longer, the vibration control section 35 performs a correction for strengthening the vibration. By contrast, if an average level of achievement of each game is equal to or more than a predetermined value, the vibration control section 35 may perform a correction for weakening the vibration.

Note that such a correction content may be changed in accordance with a kind of vibration (a scene or the like in which the vibration is generated). In the case, the vibration instruction data includes not only a strength or frequency of the vibration but also information indicating a kind of vibration (vibration that is generated in accordance with an operation of the user, vibration that is automatically generated during event generation, or the like). With reference to information regarding a kind of vibration, in the case of a particular kind of vibration, the vibration control section 35 performs a correction of the vibration in accordance with the history information. In doing so, in the case in which the user playing a game uses the vibration device 20, the vibration is weakened in accordance with the operation of the user; however, control such as an output with an untouched strength is possible without correcting the vibration that is automatically generated.

Then, as a third example, the correction processing appropriate to the application program currently executed by the application execution section 32 will be described. In the example, the correction information acquisition section 34 specifies the application program (that is, the application program for outputting an instruction for causing the vibration device 20 to be vibrated) currently executed by the application execution section 32. Then, the correction content is determined in accordance with the specified application program. In accordance with a category of a currently executed game, for example, the vibration control section 35 is assumed to cause the correction content of the vibration to be changed.

Further, the correction information acquisition section 34 may preliminarily receive designation regarding the correction content of the vibration in each application program from each user. For example, in the case in which the vibration is desired to be weakened in a particular game, the user preliminarily specifies a game and designates a value of a vibration level. FIG. 4 illustrates one example of the correction information recorded in the storage section 12 of the vibration control apparatus 10 in the case in which the designation regarding the correction content of the vibration is received from each user as described above. In an example illustrated in FIG. 4, each user designates a correction amount of the strength of the vibration with a value in each game. The correction information acquisition section 34 reads out the correction information that is associated with the user specified by the user specification section 31 and a kind of application program currently executed by the application execution section 32. The vibration control section 35 performs a correction for strengthening or weakening the strength of the vibration in accordance with the correction information. This allows the user to vibrate the vibration device 20 in accordance with his/her own desirable strength in each game.

Note that, here, the correction amount of the strength of the vibration is designated with a single value; further, in addition, the user may designate various pieces of correction information. For example, each user may designate the strength of the vibration in each frequency band. Thereby, the user can perform an adjustment for strengthening low-frequency vibration, or conversely, high-frequency vibration in each game. Further, the correction information acquisition section 34 may acquire the correction information that is associated with a kind of application program at timing in which the application execution section 32 starts up a new application program.

Further, in the case of a game etc. played by the user for the first time, it is considered that the user does not set the correction information in the game. In an example illustrated in FIG. 4, for example, a user U2 does not set the correction information regarding a game A. In the case in which the user U2 plays the game A in the above example, the vibration control section 35 may determine the correction content with reference to the correction information set by the user U2 in other games. Specifically, for example, the vibration control section 35 determines the correction content with reference to default correction information set by the same user U2. Alternatively, the vibration control section 35 may execute the correction processing by using a typical value (an average, a mode, etc.) of set values in all the other games. Alternatively, the vibration control section 35 may execute the correction processing by using a typical value of set values in a game of the same category as that of a currently played game.

Further, the vibration control section 35 may correct vibration content while the correction information described above is used in combination. As a specific example, the vibration control section 35 may specify the currently executed application program and determine the correction content with reference to the history information regarding the specified application program.

For example, the history information as illustrated in FIG. 3 is recorded in the vibration control apparatus 10 and a user U1 plays the game A. At this time, the correction information acquisition section 34 acquires, as the correction information, information indicating a play history of the past game A by the user U1. With reference to the play history, if a play time of the game A by the user U1 is long, the vibration control section 35 performs a correction for weakening the vibration. By contrast, if the play time is short, the vibration control section 35 performs a correction for strengthening the vibration. Alternatively, the vibration control section 35 may correct the strength of the vibration in accordance with an elapsed time from a use start time of the game. Depending on the above correction, the vibration control section 35 can adjust the strength of the vibration in accordance with whether or not the user is accustomed to the currently played game. Further, in the case in which the play history of the currently played game is not present, it is considered that the user plays the game for the first time. In such a case, the vibration control section 35 may perform a correction for strengthening the strength of the vibration.

According to the vibration control apparatus 10 according to the present embodiment described above, the vibration can be presented to the user in accordance with content appropriately corrected in response to the user currently using the vibration device 20. Further, the vibration control section 35 corrects the vibration content in accordance with the application program currently executed by the application execution section 32 to thereby present the vibration to the user in accordance with a more appropriate content.

Note that the embodiment of the present invention is not limited to the embodiment described above. In the above description, for example, the vibration device 20 is assumed to be an operation device that receives an operation input of the user; however, the vibration device 20 is not limited to the above operation device. Further, the vibration device 20 may be mainly used for only a presentation of the vibration to the user. Alternatively, the vibration device 20 may be a device used for other usages.

Further, at least one part of the correction processing executed by the vibration control section 35 in the above description may be realized on the side of the application program. In the case, the application execution section 32 corrects a waveform of preliminarily prepared vibration on the basis of the correction information acquired by the correction information acquisition section 34. Then, the application execution section 32 outputs the vibration instruction data for vibrating the vibration device 20 in accordance with the corrected content. The vibration control section 35 causes the vibration device 20 to be vibrated on the basis of the vibration instruction data. Also, depending on the above processing, the vibration control apparatus 10 can present the vibration to the user in accordance with the content corrected in response to the user.

Further, in the above description, it is premised that the plurality of users use the vibration device 20, and it is assumed that the user specification section 31 specifies the user currently using the vibration device 20. However, it is not necessary for the vibration control apparatus 10 to perform a specification of the user. In the case, regardless of the user using the vibration device 20, the correction information acquisition section 34 acquires, as the correction information, the attribute information of the preliminarily registered user or information regarding the use history etc. of the user. The vibration control section 35 corrects the vibration content in accordance with the correction information acquired by the correction information acquisition section 34. Thereby, in the case in which a single user normally uses the vibration device 20, it is possible to present the vibration appropriate to the user. Note that, in the example, the user specification section 31 may be eliminated.

Further, the vibration control apparatus 10 may classify the plurality of users using the vibration device 20 into several user groups and determine the correction content for each of the user groups. In the example, the user specification section 31 first specifies the user using the vibration device 20 and further specifies the user group to which the specified user belongs. The correction information acquisition section 34 acquires the correction information associated with the user group specified by the user specification section 31. Thereby, the vibration control apparatus 10 can perform a correction appropriate to the user belonging to the group and present the vibration to each user group.

Further, the correction information acquisition section 34 may acquire, as the correction information, information regarding play content of a game output by the application program. The information regarding the play content in the case may be information indicating a proficiency level of a game by the user, such as a success rate of a particular command operation. The vibration control section 35 corrects the vibration content in accordance with the correction information. Note that, even in the example, the application execution section 32 may directly correct the vibration content in accordance with the play content by the present user in place of the vibration control section 35.

Further, in the above description, it is assumed that a computer separately independent of the vibration device 20 executes the correction processing. Further, a microcomputer or the like that is housed in the vibration device 20 may execute the correction processing in accordance with the user currently using the vibration device 20. In the case, the computer that is housed in the vibration device 20 functions as the vibration control apparatus according to the embodiment of the present invention.

REFERENCE SIGNS LIST

1 Vibration control system, 10 Vibration control apparatus, 11 Control section, 12 Storage section, 13 Communication section, 14 Display apparatus, 20 Vibration device, 21 Vibration mechanism, 31 User specification section, 32 Application execution section, 33 Vibration instruction reception section, 34 Correction information acquisition section, 35 Vibration control section

The invention claimed is:

1. A vibration control apparatus that vibrates a vibration device, comprising:
a vibration instruction reception section configured to receive a vibration instruction from an executing application program in order to provide haptic feedback to any of a plurality of users of a controller, where the vibration instruction is generic to the plurality of users;
a vibration control section configured to vibrate the vibration device in accordance with content obtained by correcting the content of the received vibration instruction; and
a storage medium containing an association of a specific user, among the plurality of users of the vibration device, with correction data that specifies the correction content for such specific user,
wherein the vibration control section receives the correction data from the storage medium and determines the correction content such that the specific user, among the plurality of users, of the vibration device is delivered haptic feedback via vibrations that are customized for such specific user.

2. The vibration control apparatus according to claim 1, further comprising an application execution section configured to execute any of a plurality of kinds of application programs, wherein
the vibration instruction reception section receives the vibration instruction from the application execution section, and the vibration control section determines the correction content in accordance with the user and the application program currently executed by the application execution section.

3. The vibration control apparatus according to claim 2, further comprising a recording section configured to record information regarding a use history of the application program by the user about each of the plurality of kinds of application programs, wherein
   the vibration control section determines the correction content in accordance with the use history by the user of the application program currently executed by the application execution section.

4. The vibration control apparatus according to claim 2, further comprising a recording section configured to receive and record correction information for designating the correction content when using the application program from the user about each of the plurality of kinds of application programs, wherein
   the vibration control section determines the correction content in accordance with the correction information received from the user about the application program currently executed by the application execution section.

5. The vibration control apparatus according to claim 1, further comprising a correction information acquisition section configured to acquire attribute information of the user, wherein
   the vibration control section determines the correction content in accordance with the attribute information.

6. The vibration control apparatus according to claim 1, further comprising a recording section configured to record history information regarding the use history of the vibration device by the user about each of a plurality of users using the vibration device, wherein
   the vibration control section uses the history information of the user currently using the vibration device and determines the correction content.

7. A method of controlling a vibration device, comprising:
   receiving a vibration instruction from an executing application program in order to provide haptic feedback to any of a plurality of users of a controller, where the vibration instruction is generic to the plurality of users;
   vibrating the vibration device in accordance with content obtained by correcting the content of the received vibration instruction; and
   a storage medium containing an association of a specific user, among the plurality of users of the vibration device, with correction data that specifies the correction content for such specific user,
   wherein the vibrating includes receiving the correction data from the storage medium and determining the correction content such that the specific user, among the plurality of users, of the vibration device is delivered haptic feedback via vibrations that are customized for such specific user.

8. A non-transitory, computer readable storage medium containing a computer program, which when executed by a computer, causes the computer to control a vibration device by carrying out actions, comprising:
   receiving a vibration instruction from an executing application program in order to provide haptic feedback to any of a plurality of users of a controller, where the vibration instruction is generic to the plurality of users;
   vibrating the vibration device in accordance with content obtained by correcting the content of the received vibration instruction; and
   a storage medium containing an association of a specific user, among the plurality of users of the vibration device, with correction data that specifies the correction content for such specific user,
   wherein the vibrating includes receiving the correction data from the storage medium and determining the correction content such that the specific user, among the plurality of users, of the vibration device is delivered haptic feedback via vibrations that are customized for such specific user.

\* \* \* \* \*